US006520507B2

United States Patent
Pataille et al.

(10) Patent No.: US 6,520,507 B2
(45) Date of Patent: Feb. 18, 2003

(54) SEALING SLEEVE, ESPECIALLY FOR SMALL-DIMENSION INSTALLATION SPACES

(75) Inventors: Gilbert Pataille, Corlee (FR); Boris Tchilingurian, Langres (FR)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/858,093

(22) Filed: May 15, 2001

(65) Prior Publication Data

US 2002/0017760 A1 Feb. 14, 2002

(30) Foreign Application Priority Data

May 16, 2000 (DE) .......................... 100 24 026

(51) Int. Cl.$^7$ ................................ F16J 15/32
(52) U.S. Cl. .................. 277/561; 277/500; 277/549; 277/559; 277/560; 277/585
(58) Field of Search ................. 277/500, 549, 277/559, 560, 561, 585

(56) References Cited

U.S. PATENT DOCUMENTS 4,531,748 A * 7/1985 Jackowski .................. 277/551
5,085,444 A * 2/1992 Murakami et al. .......... 277/503
5,556,112 A * 9/1996 Brandt ....................... 277/560
6,168,164 B1 * 1/2001 Toth et al. ................... 277/559
6,336,638 B1 * 1/2002 Guth et al. .................. 277/500

FOREIGN PATENT DOCUMENTS

DE            33 16 063            5/1983

* cited by examiner

Primary Examiner—Anthony Knight
Assistant Examiner—E Peavey
(74) Attorney, Agent, or Firm—Kenyon & Kenyon

(57) ABSTRACT

A sealing sleeve made of a polymer material especially for small-dimension installation spaces, the sealing sleeve having a retaining segment and a sealing segment, the retaining segment being connected to a supporting body and the sealing segment on the peripheral side encircling a shaft to be sealed or a barrel ring in a sealing manner under radial biasing and having on the side facing the shaft a surface profiling for recirculating the lubricant, wherein the connecting diameter (interior diameter (D) of the enclosing part (31)) is 1.0 to 1.05 times the shaft diameter (W) plus four times the sleeve thickness (d).

17 Claims, 2 Drawing Sheets

SEALING SLEEVE, ESPECIALLY FOR SMALL-DIMENSION INSTALLATION SPACES

DESCRIPTION

1. Technical Area

Figure 1:
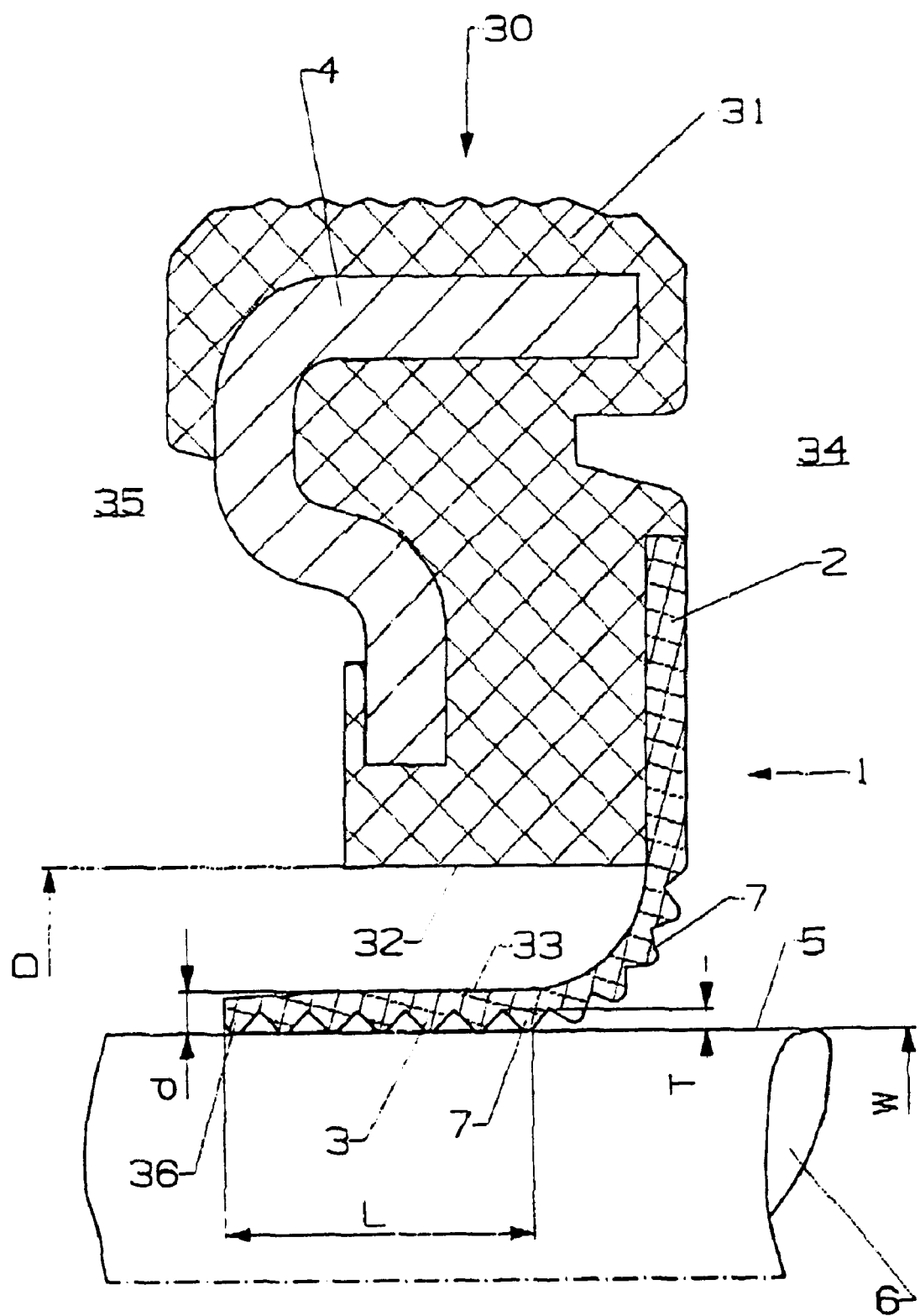

For sealing off shaft bushings, sealing arrangements are used which are designed to retain the lubricants in the interior of the housing and which prevent dust, dirt, and the like from entering the housing interior from outside. Quite varying designs are used for seals. In this context, great significance attaches, inter alia, to the size of the installation space. The smaller the installation space, the more difficult it is to seal it off. In every case, the goal is a long service life for the seal and the least possible wear and tear. The latter is also achieved by using appropriate materials such as PTFE compounds.

2. Background Information

From German Laid-Open Print 33 16 063, a sealing ring is known which is provided with a sealing sleeve made of PTFE. The sealing sleeve is formed in a trumpet-like shape opposite the space to be sealed off, and, on the side facing the shaft to be sealed off, it has recirculation elements that act in a hydrodynamic manner.

PRESENTATION OF THE INVENTION

The present invention is based on the objective of refining the known sealing ring by achieving a seal that is more reliable even in extreme operating conditions while retaining the simplest possible mode of manufacture. The sealing arrangement is designed so as to have minimal weight, a long service life, and minimal wear and tear. Any deviations from circularity, a center offset of shaft and bore hole, lack of roundness in the shaft, and the like are designed to be compensated for. And this is so even at high peripheral speeds, high temperatures, and any lubrication deficits that might arise at the sealing location.

The above-mentioned objective is achieved by the features of claim 1. Subclaims 2 through 12 contain advantageous embodiments of the idea of the invention.

Based on the related art, the sealing arrangement is provided with a sealing sleeve made of polymer material, having a retaining segment and a sealing segment. The retaining segment is connected to a supporting body, and the sealing segment surrounds a shaft to be sealed off, under radial biasing on the peripheral side. The sealing segment is provided on its side facing the shaft with a surface profiling for recirculating the lubricating oil. The configuration according to the present invention provides that the connecting diameter (interior diameter of the enclosing part) is 1.0 to 1.05 times the shaft diameter, plus four times the thickness of the sleeve. The configuration of the sealing sleeve is therefore designed on the basis of the shaft diameter. The latter is determined in relation to the connecting diameter of the enclosing part and the subsequent design steps for configuring the sealing ring are carried out. Designated as the enclosing part is the part of the sealing arrangement on which the sealing sleeve is secured.

The thickness of the sleeve is selected so that it is $1/20$–$1/300$, preferably $1/50$–$1/200$, of the shaft diameter. In this manner, the sleeve obtains a particularly planar shape. In addition, the length of the sealing segment of the sleeve is selected so as to be especially long, so that it is 3 to 15 times, preferably 4 to 12 times, the thickness of the sleeve. In this way, the contact pressure of the sealing segment on the shaft is reduced, and the loss due to friction is less. In addition, less material is used due to the especially thin configuration of the sleeve.

In addition, it is advantageous if the sleeve, in the sealing segment is smooth on its rear side and is configured so as to be grooved in a spiral manner on its sealing side. These grooves allow an efficient recirculation of the lubricant. These grooves in a generally familiar manner can be configured, in cross-section, out of symmetrical triangles or out of asymmetrical saw teeth. In this context, the more planar surfaces of the saw teeth are configured in the direction of the space to be sealed off. The depth of the grooves is selected so as to be especially high and is 70–90% of the thickness of the sleeve. Approximately 85% has proven to be preferable. The grooves themselves are extended up to the retaining segment of the sealing sleeve. As a result, good recirculation of the lubricant is assured. To prevent lubricant from escaping to the outside when the shaft is standing still, the edge of the sealing sleeve facing the ambient environment can be configured as a sealing bulge. A point-shaped interruption on one of the forward grooves is also possible here.

The interior diameter of the sleeve is executed so that the sealing segment contacts the shaft on at least four grooves. The most advantageous number is 4 to 12 grooves, but the preferred range is 7 to 8 grooves. In certain application cases, it can be advantageous to introduce multi-thread grooves.

Finally, it should be emphasized that the material used for the sealing sleeve is preferably a PTFE compound (polytetrafluoroethylene) or a fluorothermoplast.

THE EXECUTION OF THE INVENTION

The present invention is discussed in greater detail on the basis of two exemplary embodiments.

Figure 2:
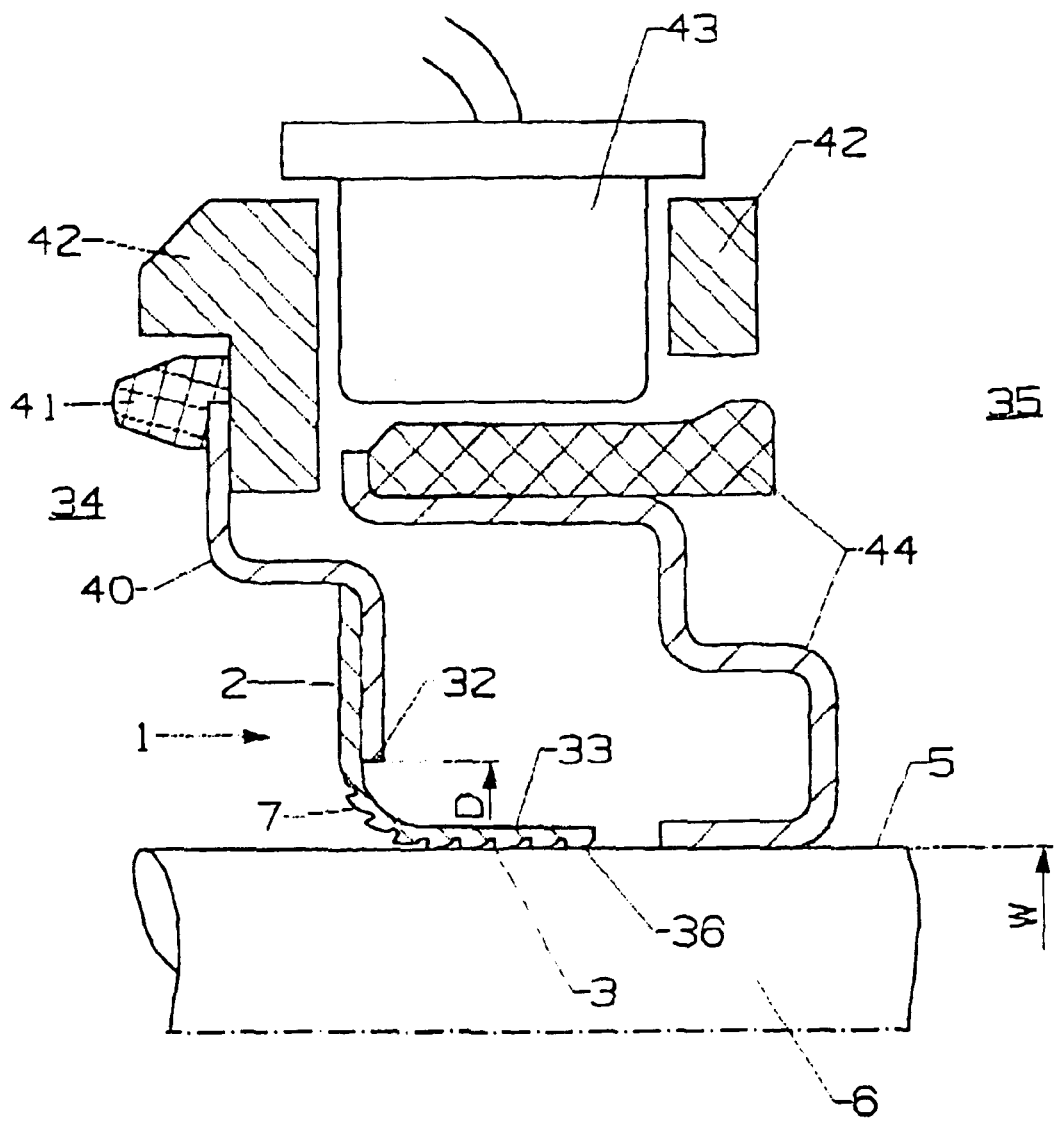

The following are the contents:

FIG. 1 depicts a longitudinal section of the sealing arrangement for a shaft, and FIG. 2 depicts a longitudinal section of a sealing arrangement on a housing cover.

In FIG. 1, the upper part of sealing arrangement 30 is depicted in a longitudinal section. Sealing arrangement 30 is essentially composed of supporting body 4, enclosing part 31 made of a polymer material, and sealing sleeve 1 made of a PTFE compound. Via enclosing part 31, sealing arrangement 30 is inserted into a housing, which is not depicted in greater detail. In addition, sealing sleeve 1 is secured to enclosing part 31. Sealing sleeve 1 is made up of retaining segment 2 and sealing segment 3. Retaining segment 2 is connected via enclosing part 31 to supporting body 4. Supporting body 4 is made of a suitable material, which is harder than the material of enclosing part 31. Sheet metal and plastics can be used. Sealing segment 3 contacts surface 5 of shaft 6. Sealing segment 3 is provided with surface profiling 7 only on the side oriented towards shaft 6. Enclosing part 31 is bordered on its interior side by cylindrical surface 32. Diameter D of this interior space is termed the connection diameter. It reflects the interior limit of retaining segment 2 of sealing sleeve 1. The diameter of the shaft is indicated as W. Sleeve thickness d is selected so as to be as small as possible. It is $1/30$ of shaft diameter W. In trials, it was possible to determine that a good seal is achieved if connecting diameter D for sleeve 1 is 1.05 times shaft diameter W, plus four times sleeve thickness d. The length of sealing segment 3 of sleeve 1 in the exemplary embodiment is roughly seven times sleeve thickness d. In this context, only length L of the part of sealing segment 3 is measured which directly contacts shaft 6. Sleeve 1 in sealing segment 3 is smooth on its rear side 33, whereas the sealing side is formed so as to have spiral-shaped grooves. Grooves 7 are made up of essentially symmetrical triangles. Space 34 to be sealed off is located on the right side of FIG. 1, so that sleeve 1 is joined to sealing arrangement 30 in the middle of the side. In this manner as well, a smaller overall height of sealing arrangement 30 is made possible. Furthermore, assembling sealing arrangement 30 on shaft 6 is made simpler. Depth T of the grooves is 85% of sleeve thickness d. Edge 36 of sealing sleeve 1, oriented with respect to ambient environment 35, is configured as a sealing bulge. Sealing segment 3 contacting shaft 6 is provided with seven grooves 7.

In a further exemplary embodiment, the supporting body of the aforementioned sealing sleeve is an integrated sealing system for sealing off a shaft, for example a housing cover, on which the sealing sleeve is formed for sealing off the shaft and seals made of a polymer material are formed for sealing off the bordering components.

FIG. 2 depicts an example of a sealing system of this type, the upper part being depicted in a longitudinal section.

The sealing system is made up of sealing sleeve 1, which is secured on sealing flange 40. The latter is connected to component 41 and reinforcement flange 42. A sensor 43 and a multipole wheel 44, revolving along with the shaft, constitute the external cover termination. The other reference numerals in FIG. 2 correspond to those in FIG. 1.

What is claimed is:

1. A sealing sleeve made of a polymer material, comprising: a retaining segment and a sealing segment, the retaining segment being connected to a supporting body and the sealing segment on the peripheral side encircling a shaft to be sealed or a barrel ring in a sealing manner under radial biasing and having on the side facing the shaft a surface profiling for recirculating lubricant, wherein the connecting diameter (interior diameter (D) of enclosing part (31)) is 1.0 to 1.05 times the shaft diameter (W) plus four times the sleeve thickness (d).

2. The sealing sleeve according to claim 1, wherein the sleeve thickness d is 1/20 to 1/300 of the shaft diameter (W).

3. The sealing sleeve according to claim 2, wherein the sleeve thickness d is 1/50 to 1/200 of the shaft diameter (W).

4. The sealing sleeve according to claim 1, wherein the length (L) of the sealing segment (3) of the sleeve (1), contacting the shaft (6), is 3 to 15 times the sleeve thickness (d).

5. The sealing sleeve according to claim 4, wherein the length (L) of the sealing segment (3) of the sleeve (1), contacting the shaft (6), is 4 to 12 times the sleeve thickness (d).

6. The sealing sleeve according to claim 1, wherein the sleeve (1), in the sealing segment (3), is smooth on its rear side (33) and is configured so as to have spiral-shaped grooves on its sealing side.

7. The sealing sleeve according to claim 6, wherein the grooves (7), in cross-section, are made up of essentially symmetrical triangles or asymmetrical saw teeth.

8. The sealing sleeve according to claim 7, wherein the more planar surfaces of the saw teeth point towards the space (34) to be sealed off.

9. The sealing sleeve according to claim 6, wherein the grooves (7) are extended up to the retaining segment (2) of the sealing sleeve (1).

10. The sealing sleeve according to claim 1, wherein the depth (T) of the grooves (7) is 70–90% of the sleeve thickness (d).

11. The sealing sleeve according to claim 10, wherein the depth (T) of the grooves (7) is 85% of the sleeve thickness (d).

12. The sealing sleeve according to claim 1, wherein the sealing sleeve (1) has an edge (36) on the side of the ambient environment which is configured as a sealing bulge.

13. The sealing sleeve according to claim 1, wherein the sealing segment (3), contacting the shaft, has 4 to 12 grooves (7).

14. The sealing sleeve according to claim 13, wherein the sealing segment (3), contacting the shaft, has 7 to 8 grooves (7).

15. The sealing sleeve according to claim 13, wherein the grooves (7) are of the multithread type.

16. The sealing sleeve according to claim 1, wherein the sealing sleeve (1) is made of a PTFE compound.

17. The sealing sleeve according to claim 13, wherein the sealing sleeve is suitable for small-dimension installation spaces.

* * * * *